Patented Oct. 5, 1943

2,330,962

UNITED STATES PATENT OFFICE 2,330,962

ORGANIC COMPOUND OF ANTIMONY AND PROCESS FOR MAKING IT

Joseph George Feinberg, Brooklyn, N. Y., assignor to Parke, Davis & Company, Detroit, Mich., a corporation of Michigan No Drawing. Application March 31, 1941, Serial No. 386,063

8 Claims. (Cl. 260—446)

This invention, which forms a continuation in part of my application filed May 27, 1940, Serial No. 337,445, relates generally to a series of new organic compounds of antimony and to processes for their manufacture, these compounds embodying certain properties which render them useful as medicinal and insecticidal agents.

One of the primary objects of this invention is to provide a method, and the reaction products thereof, wherein compounds of antimony are combined with an alcoholamine, or a condensation product thereof, to form new compounds capable of entering into stable aqueous solution. This property would be desirable in medicinal compounds to be administered parenterally.

A contrasting, but not contradictory, object of this invention is to provide a method, and the reaction products thereof, wherein compounds of antimony are combined with an alcoholamine, or a condensation product thereof, to form new compounds of antimony, in liquid form, which are insoluble in water. Such compounds would be of definite use in the permanent impregnation of porous materials which are so employed that they are in more or less constant contact with water.

A more specific object of the instant invention is to provide a composition of matter consisting of the reaction product of an antimony compound and triisopropanolamine in an inert solvent, such as propylene glycol, as a reaction medium.

A further object of the invention is to provide a process whereby inorganic salts of antimony may, through chemical combination, be converted to organic compounds, which latter compounds possess none of the irritant or caustic properties that may have been inherent in the inorganic salt.

A still further object of the invention is to treat relatively water insoluble compounds of antimony and so alter them through chemical combination that new compounds are produced, which latter compounds are soluble in water and are capable of forming relatively stable aqueous solutions.

Another aim of the invention is to treat those compounds of antimony which hydrolyze in aqueous solution to so alter them through chemical combination that new compounds are produced, which latter compounds are not hydrolyzed in aqueous solution.

Another object of the invention is to treat compounds of antimony to so alter them through chemical combination that new compounds are formed, which latter compounds possess physiological and therapeutic properties more desirable than those of the original compounds.

Yet another object of the invention is to prepare, through chemical combination, certain compounds of antimony which may be processed into forms suitable for medicinal purposes, either through conversion into sterile injectible solution, or into forms suited for oral administration. Such compounds naturally suggest themselves for use in those pathological conditions wherein the properties of antimony are of known or suspected therapeutic value, such conditions being readily apparent to those skilled in human or animal medicine.

This invention has for a further aim to provide a series of substantially homologous compounds wherein antimony may be incorporated in either the trivalent or pentavalent state. This achievement is of considerable importance from a therapeutic standpoint since it is well established that various disease conditions respond differently to the trivalent and pentavalent forms of antimony.

By way of definition, the term "alcoholamine" as used herein, refers to that class of amines in which one or more of the organic radicals contains an hydroxyl group.

The method contemplated by this invention involves the reaction of an antimony compound with triisopropanolamine in the presence of propylene glycol. The function of the latter is merely that of a reaction medium and solvent for the final reaction product. This is demonstrated by the fact that the reaction may be carried out in the total absence of solvent, or in the presence of water, ethylene glycol or diethylene glycol as the solvent. Therefore, propylene glycol is unessential to the process, is employed simply as a convenience, and may be dispensed with or replaced by other suitable solvents.

Triisopropanolamine is employed in the type process since I have found it most suitable for the production of stable products. However, other alcoholamines—e. g. monoethanolamine, diethanolamine, triethanolamine, phenyl ethanolamine, phenyl diethanolamine, ethyl phenyl ethanolamine—or a condensation product of such compounds—e. g. morpholine—are capable of reacting with antimony compounds and may be substituted for the triisopropanolamine. As a matter of fact, for some commercial purposes, triethanolamine, or one of the other cheaper alcoholamines, may be preferred to triisopropanolamine.

In the practice of the invention, it is generally necessary or advisable to apply heat to the mixture of chemicals to effect or hasten reaction. However, certain of the more reactive compounds of antimony—e. g. antimony pentachloride—react spontaneously in an exothermic manner with triisopropanolamine, and in these cases the external application of heat is unnecessary.

In the course of the research conducted, a large number of antimony compounds have been combined with triisopropanolamine by means of the type process described below. Such representative compounds as antimony trichloride, antimony oxychloride, antimony pentachloride, antimonial catechol, antimonial catechol chloride and antimony tribromide have been successfully employed. On the other hand, certain compounds, such as the sulfide of antimony, do not directly enter into the reaction under the conditions employed. As a result of this discovery I have reached the conclusion that compounds of antimony are generally capable of reacting with triisopropanolamine, but the degree of reaction is subject to the influence of the elements or radicals affixed to the antimony in the compounds used.

By way of example rather than by way of limitation, I will detail the process for combining antimonial catechol with triisopropanolamine:

Antimonial catechol, prepared in the usual manner, is thoroughly washed with cold, distilled water, then with alcohol and ether, and dried in vacuum. A mixture of 16 gms. of triisopropanolamine and 20 cc. of propylene glycol are warmed on a water bath, or other suitable source of heat, until solution is effected. To avoid possible decomposition of the reaction product, it is advisable to keep the temperature below 100° C. throughout the process. To this mixture is added 6.5 gms. of antimonial catechol and the whole is stirred until the antimonial catechol is dissolved. The resultant product is filtered through filter paper, using a Buchner funnel and suction. The filtrate, which represents the reaction product dissolved in a mixture of propylene glycol and excess unreacted triisopropanolamine, is stored in an amber glass bottle.

Other compounds of antimony are readily substituted in the process by employing such quantities of these other compounds as will contain amounts of antimony equivalent to that contained in antimonial catechol. However, I wish to emphasize that the quantities I have employed in the above process are not critical, but are arbitrarily chosen for convenience. As a matter of fact, in commercial application of the invention, it will probably be deemed advisable to raise the ratio of antimony to triisopropanolamine, since the triisopropanolamine is often the most expensive of the materials used.

Throughout this invention I have claimed a chemical reaction between the antimony compounds and the triisopropanolamine. That actual chemical reaction, rather than simple solution, is involved is borne out by several observations. I have already mentioned that in several cases considerable heat is evolved, which, though not conclusive evidence, tends to point to a chemical reaction taking place. Further evidence of chemical reaction is the alteration of certain properties of the original antimony compounds employed. Thus, those compounds which are originally water insoluble—e. g. antimonial catechol—yield water soluble reaction products; those compounds which are originally caustic—e. g. antimony trichloride—yield non-caustic reaction products; those compounds which originally hydrolyzed in aqueous solution—e. g. antimony pentachloride—yield reaction products which do not hydrolyze in aqueous solution.

The finally conclusive evidence of a true chemical reaction lies in the observation I have made in those cases where a readily identifiable by-product of the reaction is formed, in that I have detected this by-product upon completion of the reaction. Thus, when antimony trichloride and antimony pentachloride are reacted with triisopropanolamine, needle-like white crystals separate on standing. These crystals have been identified as the hydrochloride of the excess, unreacted triisopropanolamine, indicating the formation of hydrogen chloride in the course of the reaction between the chlorides of antimony and triisopropanolamine. This formation of hydrogen chloride points definitely to a double decomposition reaction with the elimination of a chloride ion from the antimony chloride and the elimination of a hydrogen ion from the triisopropanolamine.

The resultant reaction products are complex in nature and their ultimate chemical composition has not been determined, but I have observed and noted certain of their characteristics. Though the properties of the reaction products are, naturally, somewhat dependent upon the original antimony compound and alcoholamine employed in the reaction, the following general observations may be made:

When prepared in accordance with the type process presented above, the resultant product is a somewhat viscous liquid which retains the characteristic odor of the triisopropanolamine, the latter being present in excess, except where this odor is obscured by the acrid odor of liberated hydrogen chloride. The color of the compounds produced ranges from a light straw shade to the deeper amber shades.

The solubility of these compounds in water depends upon the solubility of the alcoholamine employed. Generally, those antimony compounds prepared from alcoholamines containing only alkyl radicals are readily soluble in absolute alcohol, acetone, glycerine and chloroform, but only slightly soluble in ether and toluene. Their aqueous solutions are not decomposed by boiling and are compatible with blood plasma. Again by way of example rather than by way of limitation, I have demonstrated that doses of 1 c. c. to 5 c. c. of an aqueous solution of triisopropanolamine-antimonial catechol, containing 8.5 mgms. of antimony per c. c., may be injected intravenously into dogs over a period of time without producing any ill effects. Further, I have demonstrated that if employed on dogs infested with *Dirofilaria immitis* this solution will free the blood stream of the infested animal of the larvae of *Dirofilaria immitis*.

On the other hand, reaction products of antimony compounds and alcoholamines containing one or more aromatic groups are generally insoluble in water. Far from being an undesirable property, this insolubility in water may be most desirable for certain specific purposes—e. g. impregnation of porous materials which of necessity are subject to more or less constant contact with water.

Having thus described the invention, I claim:

1. A method of producing a composition of matter of the character described, which consists in adding antimonial catechol to triisopropanolamine and heating the mixture until the reaction is completed.

2. A method of producing a composition of matter of the character described, which consists in adding antimonial catechol to a mixture of triisopropanolamine and propylene glycol, and heating the whole until the reaction is completed.

3. A composition of matter consisting of the reaction product of antimonial catechol and triisopropanolamine.

4. A composition of matter consisting of the reaction product of antimonial catechol and triisopropanolamine in propylene glycol.

5. A method of producing a composition of the character described, which consists in directly reacting under substantially anhydrous conditions an amine of the group hydroxy alkyl amines and N-aryl substituted hydroxy alkyl amines with an antimony compound of the class antimonial catechol, its halides.

6. Process according to claim 5 wherein the reaction is carried out in an organic solvent inert to the amine and antimony compounds reacting in the process.

7. A compound consisting of a reaction product of the process of claim 5.

8. A composition consisting of a water soluble reaction product of the process of claim 5.

JOSEPH GEORGE FEINBERG.